United States Patent [19]

Meckler

[11] 3,918,525

[45] Nov. 11, 1975

[54] CIRCULATING SYSTEM

[76] Inventor: Gershon Meckler, 2750 Ridge Valley, Atlanta, Ga. 30326

[22] Filed: Sept. 20, 1974

[21] Appl. No.: 507,857

Related U.S. Application Data

[63] Continuation of Ser. No. 305,602, Nov. 10, 1972, abandoned, which is a continuation-in-part of Ser. No. 282,193, Aug. 2, 1972, abandoned.

[52] U.S. Cl. .................... 169/10; 169/16; 169/19; 169/23
[51] Int. Cl.$^2$ ......................................... A62C 35/34
[58] Field of Search ......... 169/60, 5, 10, 13, 16–18, 169/19, 23; 137/557; 165/138, 50

[56] References Cited
UNITED STATES PATENTS

| | | | |
|---|---|---|---|
| 1,087,136 | 2/1914 | Nutter et al. | 169/5 |
| 1,229,071 | 6/1917 | Hammond | 169/5 |
| 2,017,841 | 10/1935 | Coleman | 169/16 X |
| 3,612,167 | 10/1971 | Bihler | 164/50 |

*Primary Examiner*—John J. Love
*Attorney, Agent, or Firm*—John C. Purdue

[57] ABSTRACT

A combined circulating and alarm apparatus is disclosed. The circulating apparatus includes a circulating system including means for circulating a heat transfer fluid from an equipment room and into heat-transfer relationship with a plurality of energy absorbing and/or energy supplying units, for example lighting fixtures, means for returning the circulated fluid to the equipment room, means effective to cause heat transfer with the returned fluid to control the temperature thereof, for example to absorb heat therefrom, and means for delivering the heat transfer fluid from the heat transfer means to the circulating means. Sprinkler heads are operatively connected to the circulating system. The apparatus also comprises means effective, in response to a change in a sensed condition, which change indicates a flow of heat transfer fluid from the circulating system, to cause a signal, and means operatively connected to the sensor means and effective, in response to a signal therefrom, to communicate a warning to a normally inhabited region such as the equipment room or a fire station.

1 Claim, 4 Drawing Figures

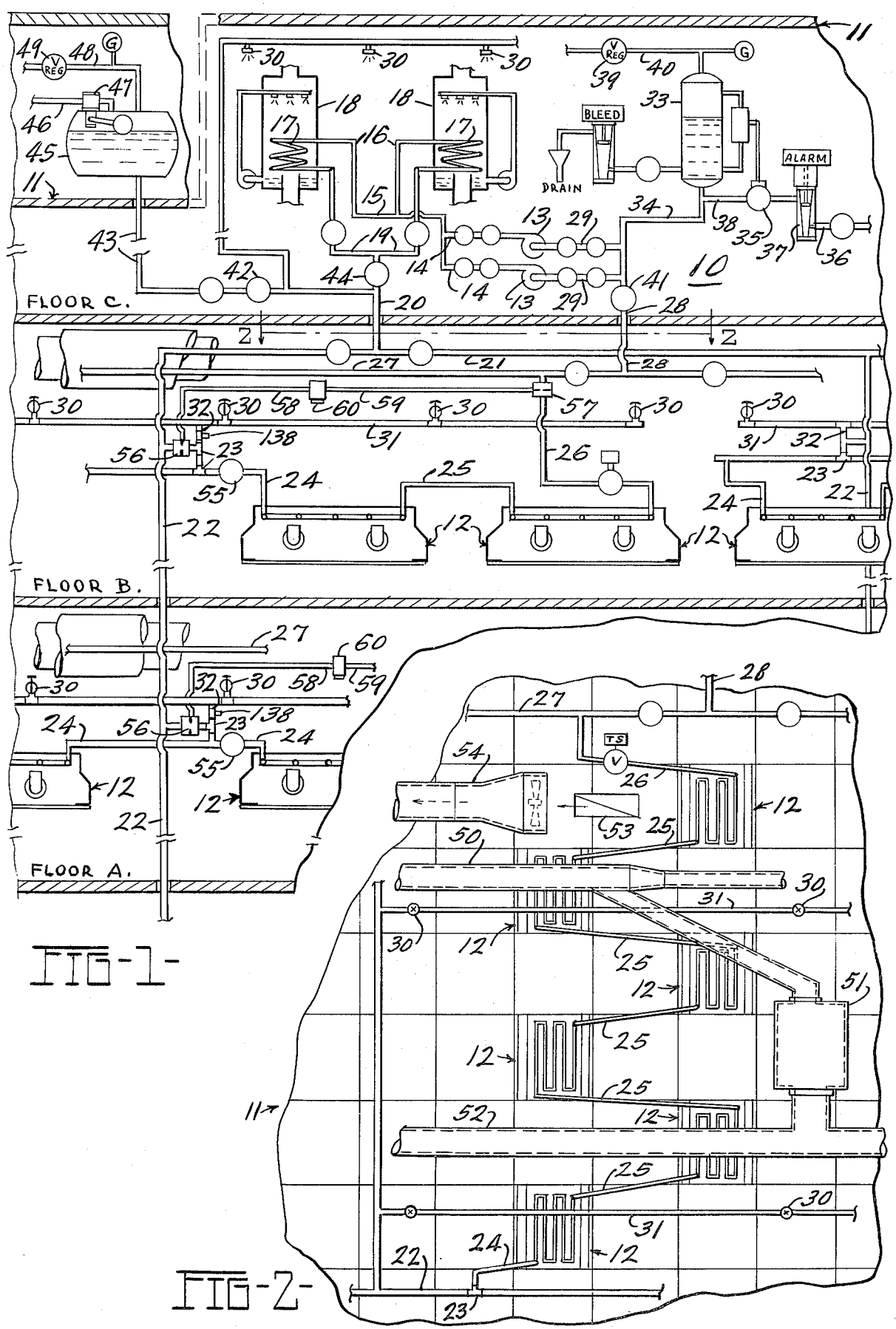

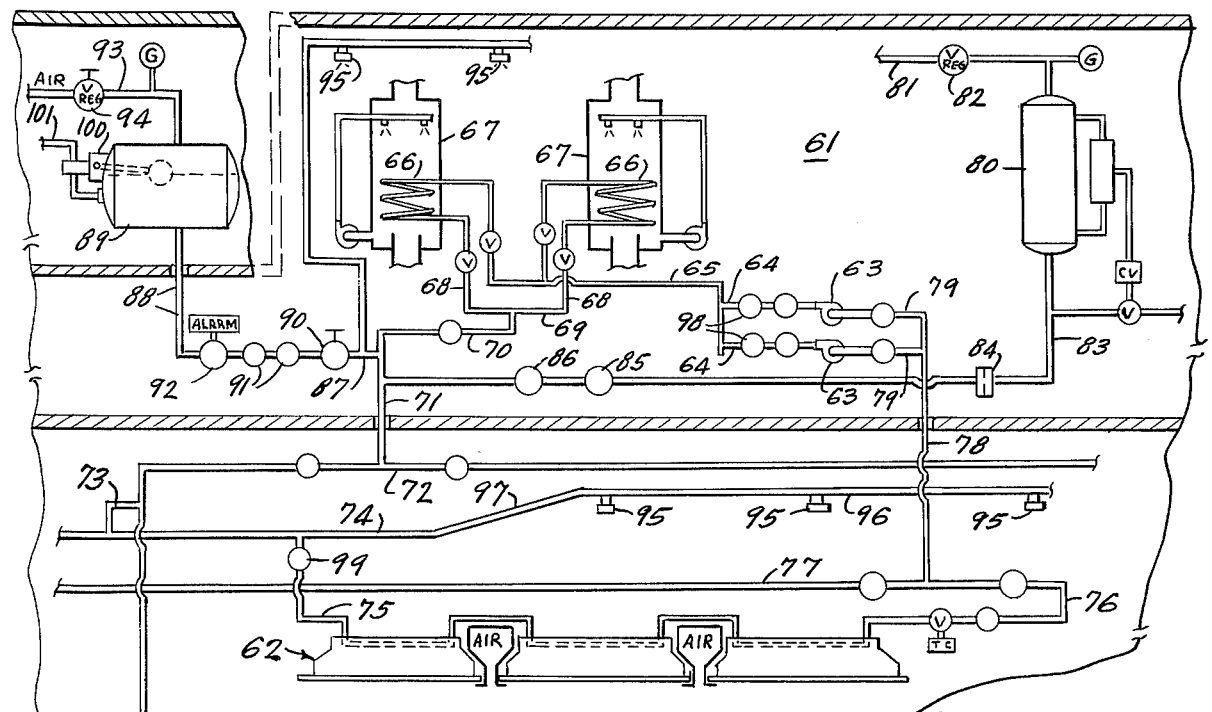
FIG-3-
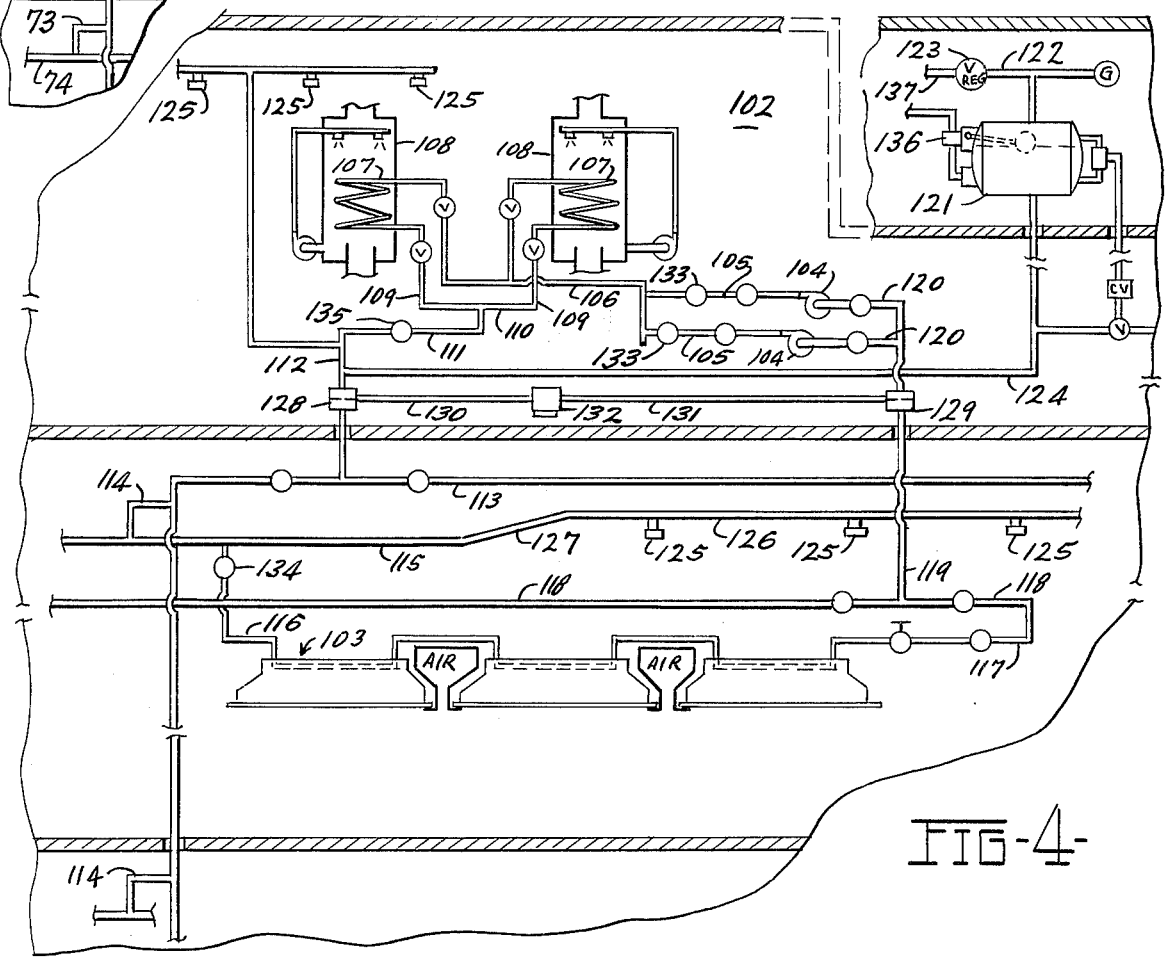
FIG-4-

CIRCULATING SYSTEM

REFERENCE TO RELATED APPLICATION

This is a continuation of application Ser. No. 305,602, filed Nov. 10, 1972, now abandoned, which, in turn, was a continuation-in-part of application Ser. No. 282,143, filed Aug. 21, 1972, now abandoned.

BACKGROUND OF THE INVENTION

The use of a heat transfer fluid, usually water, has many advantages in air conditioning systems. For example, such a fluid can be circulated into heat transfer relationship with, and to absorb heat from, lighting fixtures, thermal louvers positioned adjacent windows to intercept radiant solar energy, or interceptors for radiation from other energy sources within a building. It frequently is necessary to remove heat from one portion of an air conditioned building and, at the same time, to add heat to a different portion of the same air conditioned building. The heat absorbed by the circulated heat transfer fluid, therefore, can often be used to add the required heat to a different portion of the same building. Ultimately the circulated heat transfer fluid is returned to an equipment room, and heat is either transferred to the fluid or from the fluid, as required, to maintain a control temperature. Because of the comparatively high temperature level at which heat from lights, from solar energy and from radiant energy sources within a building can be absorbed and transferred to a heat transfer fluid, a cooling tower, usually of the indirect type, can be used to transfer heat from the circulated fluid in the equipment room, under cooling conditions. In this way, the energy requirements for air conditioning of a building can be minimized.

Much attention has been given to the necessity for fire protection in buildings. One approach has been to use materials of construction which are resistant for a limited period of time, to the conditions which prevail during a fire, presumably for a time sufficiently long to enable occupants of the building to escape to the outside. It has also been suggested* that sprinkler heads can be provided, and that water or the like can be supplied thereto from a circulating system used to transfer heat to or from the building, as discussed above.

*See, for example, U.S. Pat. No. 3,612,167, issued Oct. 12, 1971.

SUMMARY OF THE INVENTION

The instant invention is based upon the discovery of combined circulating and alarm apparatus comprising a circulating system of the indicated type for circulating a heat transfer fluid to and from various portions of a building, for example to absorb heat as a consequence of flow through light fixtures, thermal louvers, and the like, and including connections with sprinkler heads installed for fire protection. The alarm includes a sensor which monitors a condition of the circulated heat transfer fluid and, in response to a change in the condition monitored, which change indicates a flow of heat transfer fluid from the circulating system, as when one or more of the sprinkler heads has been opened, communicates an alarm to a normally inhabited region such as an equipment room or a fire station.

OBJECTS OF THE INVENTION

It is an object of the invention to provide an alarm for a heat transfer fluid circulating system which is, in normal operation, a part of the air conditioning apparatus of a building, but which is also operatively connected with sprinkler heads for fire protection.

It is another object of the invention to provide combined circulating and alarm apparatus including a control which communicates an alarm and converts a circulating system that is normally a part of the air conditioning apparatus of a building to a water supply system for an activated sprinkler head or heads associated therewith.

Other objects and advantages will be apparent from the description which follows, reference being made to the attached drawings.

BRIEF DESCRIPTION OF THE DRAWINGS

FIG. 1 is a fragmentary, partially schematic view in sectional elevation of a building including combined circulating and alarm apparatus according to the invention.

FIG. 2 is a fragmentary plan view showing further details of the apparatus of FIG. 1.

FIG. 3 is a partially schematic view in elevational section, similar to FIG. 1, but showing different alarm system according to the invention.

FIG. 4 is a fragmentary, partially schematic view in sectional elevation, also similar to FIG. 1, but showing a still different alarm system according to the invention.

DESCRIPTION OF THE PREFERRED EMBODIMENTS

Combined circulating and sprinkler apparatus according to the invention is shown in FIG. 1. The apparatus of FIG. 1 comprises a circulating system through which a heat transfer fluid, usually water, is circulated from an equipment room 10, represented as the top floor, or a portion of the top floor of a building indicated generally at 11 into heat transfer relationship with each of a plurality of water cooled lighting fixtures 12, and back to the equipment room. The circulating system includes two pumps 13 which deliver the heat transfer fluid to lines 14 and from thence to a line 15 which connects with lines 16 and deliver the heat transfer fluid to coils 17 in indirect evaporative coolers 18. Heat transfer fluid from the coils 17 flows through lines 19, 20 and 21, headers 22, tees 23 and lines 24 to first ones of the water-cooled lighting fixtures 12. As shown in FIG. 1, the lighting fixtures 12 are connected in series to the circulating system by conduits 25. After flow through the last of the water-cooled lighting fixtures 12 connected in series, the heat transfer fluid flows through lines 26, 27, 28 and 29, back to the pumps 13.

The apparatus of FIG. 1 also includes a plurality of sprinkler heads 30 mounted on conduits 31, and operatively connected through the conduits 31 and feeders 32 (which are parts of the tees 23) to the headers 22, and the circulating system.

A constant pressure is maintained on the circulating system of the apparatus of FIG. 1 by means of a surge tank 33 connected to the line 28 through a conduit 34. A constant level of water is maintained in the surge tank 33 by introducing water into the system from a source (not illustrated) under the control of a valve 35, through a line 36, a rotameter 37, and a line 38. A constant pressure is maintained in the surge tank 33 and consequently, in the line 28, by compressed air from a suitable source (not illustrated) introduced into the upper portion of the tank 33 under the control of a regulating valve 39, and through a line 40.

When the circulating system of the apparatus of FIG. 1 is performing its normal function of providing fluid for heat transfer with the lighting fixtures 12 there are only minimal losses of fluid from the circulating system, and only a mirror flow of make-up water through line 36. However, when a fire activates one more of the sprinkler heads 30 there is an immediate and substantial loss of fluid from the circulating system, and a consequent substantial increase in the rate at which make-up water flowing through the line 36 is required to maintain a constant level of water in the tank 33. This increased rate of flow is sensed by the rotameter 37, which is of the alarm type, causing a signal when the flow therethrough exceeds a predetermined maximum. This signal is used to sound an audible alarm in the normally habited equipment room 10, to close a normally open valve 41 in the line 28, to open a normally closed valve 42 in a line 43, to close a normally open valve 44 in the line 20, and to de-energize the pumps 13. Closing the valves 41 and 44 and de-energizing the pumps 13 in effect eliminates the heat transfer portion thereof from the circulating system. Opening the valve 42 establishes an operative connection between a reservoir 45 and the line 20 as well as to the activated sprinkler head or heads 30. The signal from the rotameter 37 can also be used to activate an alarm at an appropriate fire station, in a normally habited portion of the building 11 other than the equipment room 10, or both. The reservoir 45 also has a connection through a line 46 and a float-controlled valve 47 to a standpipe (not illustrated) so that water can be pumped into the reservoir 45 to keep the sprinkler system operating during the fighting of a fire. In addition, the reservoir 45 is maintained under a constant pressure by means of compressed air from a source (not illustrated) introduced into the upper portion of the reservoir 45 through a line 48 under the control of a regulating valve 49.

Referring to FIG. 2 of the drawings, in the specific embodiment of the invention illustrated, the fixtures 12 in adjacent rows are connected in series. Primary conditioned air from ducts 50 is mixed with room or plenum air in mixing units 51, and delivered to the various zones of the building 11 from ducts 52, as required, to maintain desired temperature conditions. The relief air from various zones of the building 11 is introduced through ceiling grills 53 into ducts 54 and exhausted from the building 11, preferably (referring to FIG. 1) being used in the evaporative coolers 18, where its comparatively low humidity can increase the effectiveness of the coolers 18.

Referring, again, to FIG. 1, the float-controlled valve 47 is closed so long as the water level in the reservoir 45 is normal, as shown. Under fire conditions, water is withdrawn from the reservoir 45, lowering the water level therein, and opening the valve 47. So long as the water level in the reservoir 45 is sufficiently low that the valve 47 is open, water from a source other than the system of the building 11, for example from the city hydrant, introduced into the standpipe (not illustrated) can flow into the reservoir 45. It will be apprecited that it is common practice, in fighting a fire, to use a pumper to introduce water under comparatively high pressure, for example in the vicinity of 300 pounds per square inch, into a building standpipe to serve the sprinkler system of the building. The valve 47 prevents such high pressure water from subjecting the light fixtures 12 to a high pressure. Since the equipment room 10 in the FIG. 1 apparatus is on the top floor of the building 11, high pressure water is not required in the reservoir 45, as gravity flow therefrom is adequate, even under fire conditions. The apparatus also includes, however, valves 55 in the lines 24. The valves 55 can be automatic, and closed by the signal from the rotameter 37 which indicates a fire condition. When the valves 55 are so operated, high pressure water in the reservoir 45 is prevented from subjecting the light fixtures 12 to high pressure, and the level controlling valve 47 is not necessarily required to prevent high pressure in the reservoir 45. Such use of the valves 55 is important in apparatus of the class described where a reservoir must, under fire conditions, serve sprinkler heads positioned thereabove.

The apparatus of FIG. 1 also includes restricting orifices 56 and 57 in the tees 23 and in the lines 26, respectively. It will be appreciated that, when the system is performing its normal function of circulating a heat transfer fluid, there is no flow through the connectors 32, and, as a consequence, that the flow through the orifices 56 and 57 is the same. These orifices are sized so that at equal flows, the pressures are equal; these normally equal pressures are transmitted through lines 58 and 59 to opposite sides of a diaphragm switch 60. Whenever water flows through one of the sprinkler heads 30, there is a pressure difference between the orifices 56 and 57, and the diaphragm switch 60 is closed. The closing of the switch 60 can be used to complete a circuit to light a designator on a control panel indicating the floor and zone where there is a differential pressure and, accordingly, where there is a fire that needs to be extinguished.

Referring to FIG. 3, a modified control and circulating system is shown. The system of FIG. 3, in normal operation, circulates a heat transfer fluid from an equipment room 61 to combined water- and air-cooled lighting fixtures 62, and back to the equipment room 61. Only one lighting fixture 62 is shown in FIG. 3, but it is to be understood that the system would include a plurality of such fixtures connected in series, generally as in the system of FIGS. 1 and 2. The circulating system of the FIG. 3 apparatus includes pumps 63 which deliver heat transfer fluid through lines 64, from thence into a line 65 and into coils 66 in indirect heat exchangers 67. Heat transfer fluid leaves the coils 66 through lines 68 and flows through lines 69 and 70 and a connector 71 and from thence into the fixtures 62 through a header 72, a connector 73, a supply header 74 and a connector 75. The heat transfer fluid returns from the fixtures 62 through a connector 76, a return header 77 and lines 78 and 79 to the pumps 63. Make-up water is added to the FIG. 3 apparatus from a surge tank 80, which is maintained at a constant pressure by compressed air which enters the top of the tank through a line 81, under the control of a regulating valve 82. Make-up water from the tank 80 flows through a line 83 in which there is a restricting orifice 84, followed by a check valve 85 and a control valve 86, and from the line 83 through the connector 71 into the header 72. A line 87 also connects to a line 88 and to a reservoir 89, and has a normally open manual valve 90, check valves 91 and an alarm valve 92.

When the FIG. 3 apparatus is operating normally, the surge tank 80 is pressurized to maintain a given pressure, say 60 psi. gauge in the line 83, while the reservoir 89 is pressurized by compressed air from a source (not illustrated) through a line 93, under the control of a regulating valve 94 to maintain a lower pressure, say 50 psi. gauge. The resulting pressure differential causes the check valves 91 in the line 87 to assume a closed position, so that the system merely circulates a heat transfer fluid, to the fixtures 62 in the apparatus specifically shown.

The apparatus of FIG. 3 also includes sprinkler heads 95 operatively connected through headers 96 (one shown) and connectors 97 to the supply header 74. When any one of the sprinkler heads 95 opens, there is immediately a substantial flow of heat transfer fluid from the apparatus, and a consequent need for a greater flow of fluid from the surge tank 80 to maintain the given pressure. However, the restrictive orifice 84 in the line 83 prevents this greater flow and, as a consequence, causes a pressure drop in the line 83, the connector 71 and the line 87. This pressure drop causes the normally closed check valves 91 to open so that water flows from the reservoir 89 through the lines 88 and 87, and into the system. This flow of water through the line 87 closes a switch in the alarm valve 92. Closing of the switch in the alarm valve 92 causes a signal in a control circuit which communicates an audible or other warning of the sensed condition indicative of a fire. The signal in the control circuit can also close the normally open valve 86 in the line 83, de-energize the pumps 63, close valves 98 in the lines 79 to isolate the heat exchangers 67 from the circulating system, and close valves 99 in the connectors 75 to prevent the circulation of heat transfer fluid through the fixtures 62. Neither isolation of the heat exchanger 67 from the circulating system nor prevention of the circulation of heat transfer fluid through the fixtures 62 is necessary in the apparatus specifically shown in FIG. 3, because the reservoir 80 has a level control valve 100 in a line 101 which is connected to a standpipe (not illustrated), so that the heat transfer portion of the apparatus would not be subjected to excessive pressures even if water at, say, 300 psi. were pumped into the reservoir 89. Such isolation of the heat exchangers 67 and prevention of flow through the fixtures 62, as by the closing of valves 99 under fire conditions is essential when apparatus according to the invention is arranged so that high pressure water is used under fire conditions.

Referring to FIG. 4, a modified control and circulating system is shown. The system of FIG. 4, in normal operation, circulates a heat transfer fluid from an equipment room 102 to combined water- and air-cooled lighting fixtures 103, and back to the equipment room 102. Only one lighting fixture 103 is shown in FIG. 4, but it is to be understood that the system would include a plurality of such fixtures connected in series, generally as in the systems of FIGS. 1, 2 and 3. The circulating system of the FIG. 4 apparatus includes pumps 104 which deliver heat transfer fluid through lines 105, from thence into a line 106 and into coils 107 in indirect heat exchangers 108. Heat transfer fluid leaves the coils 107 through lines 109 and flows through lines 110 and 111 and a connector 112 and from thence into the fixtures 103 through a header 113, a connector 114, a supply header 115 and a connector 116. The heat transfer fluid returns from the fixtures 103 through a connector 117, a return header 118 and lines 119 and 120 to the pumps 104. Make-up water is added to the FIG. 4 apparatus from a combined reservoir and surge tank 121, which is maintained at a constant pressure by compressed air which enters the top of the tank through a line 122, under the control of a regulating valve 123. Make-up water from the tank 121 flows through a line 124 and the connector 112 into the header 113.

The apparatus of FIG. 4 also includes sprinkler heads 125 operatively connected through headers 126 (one shown) and connectors 127 to the supply header 115. When any one of the sprinkler heads 125 opens, there is immediately a substantial flow of heat transfer fluid from the apparatus, and a consequent need for a greater flow of fluid from the reservoir-surge tank 121 and through the connector 112 and a restricting orifice 128 therein. It will be appreciated that, when the system is performing its normal function of circulating a heat transfer fluid, there is no flow through the connectors 127, and, as a consequence, that the flow through the orifice 128 and an orifice 129 in the return line 119 is the same. These orifices are sized so that at equal flows, the pressures are equal; these normally equal pressures are transmitted through lines 130 and 131 to opposite sides of a diaphragm switch 132. Whenever water flows through one of the sprinkler heads 125, there is a pressure difference between the orifices 128 and 129, and the diaphragm switch 132 is closed. The closing of the switch 132 causes a signal in a control circuit which communicates an audible or other warning of the sensed condition indicative of a fire. The signal in the control circuit can also de-energize the pumps 104, and close valves 133 in the lines 105 to isolate in combination with a check valve 134 in the line 111, the heat exchangers 108 from the circulating system, and to close valves 135 in the connectors 116 to prevent the circulation of heat transfer fluid through the fixtures 103. Neither isolation of the heat exchangers 108 from the circulating system nor prevention of the circulation of heat transfer fluid through the fixtures 103 is necessary in the apparatus specifically shown in FIG. 4, because the reservoir 121 has a level control valve 136 in a line 137 which is connected to a standpipe (not illustrated), so that the heat transfer portion of the apparatus would not be subjected to excessive pressures even if water at, say, 300 psi. were pumped into the reservoir 121. Such isolation of the heat exchangers 108 and prevention of flow through the fixtures 103, as by closing of the valves 134 under fire conditions, is essential when apparatus according to the invention is arranged so that high pressure water is used under fire conditions.

It will be appreciated that the apparatus of FIGS. 1–4 of the instant invention, as described above includes means for sensing a change in a condition of the circulating system, which change indicates a flow of heat transfer fluid therefrom at a rate sufficiently high to mean that fluid is flowing through at least one of the sprinkler heads, and means for communicating an alarm in response to such a change in the monitored condition. It will also be appreciated that such a change in the monitored condition could occur as a consequence of a leak in the circulating system, rather than as a consequence of the activation of one of the sprinkler heads by a fire.

Referring to FIG. 1, the apparatus shown includes a plurality of flow sensing switches 138, one in each of the feeders 32 through which fluid flows to the conduits 31 and the sprinkler heads 30. The switches 138 have hinged contact members (not illustrated) which assume a normally open position except when fluid is flowing therethrough in a predetermined direction; such flow through one of the switches 138 moves the contact member therein to close that switch. The flow detecting switches 138 can be parts of separate circuits through which signals from a closed one or ones thereof are transmitted to an enunciator panel to indicate the an alarm from the rotameter 37 means a fire condition, and the location of the fire. Similarly, the signal from any of the circuits in which one of the switches 138 is closed can be used to close a relay to change the nature of the alarm communicated by the rotameter 37, for example from an audible or other alarm restricted to the equipment room to one communicated throughout the building, to an appropriate fire station, or both. When the flow indicating switches 138 are so used, an alarm from the rotameter 37 and a signal from a circuit served by one of the diaphragm switches 60, in the absence of a signal from the circuit served by the corresponding one of the flow indicating valves 138, means a leak in the circulating system, rather than a fire condition.

What I claim is:

1. In a circulating system comprising means for circulating a heat transfer fluid from an equipment room and into heat-transfer relationship with a plurality of energy absorbing units, means for returning the circulated fluid to the equipment room, means effective to cause heat transfer with the returned fluid to control the temperature thereof, means for delivering the heat transfer fluid from the heat transfer means to the circulating means, means for delivering make-up fluid to the circulating system, and means operatively connecting a plurality of sprinkler heads to the circulating system, a control comprising, in combination, normally open valve means effective in a closed position but ineffective in an open position to prevent the circulation of the heat transfer fluid into heat-transfer relationship with the energy absorbing units, said valve means being ineffective in both positions to prevent flow of the heat-transfer fluid to the sprinkler heads, means effective, in response to a change in a sensed condition, which change indicates a flow of heat transfer fluid from the circulating system, to cause a signal, and means operatively connected to said sensor means and effective, in response to a signal from said sensor means, to close said normally open valve means.

* * * * *